C. B. HORTON, dec'd.

S. HOWES, A. BABCOCK, (per N. BABCOCK, Committee,) N. BABCOCK and C. EWELL, Assignees of R. L. HORTON and B. C. HORTON, Admr's.

Grain-Scourer.

No. 8,352. Reissued July 30, 1878.

Simeon Howes
Alphus Babcock by Norman Babcock
Committee
Norman Babcock, Carlos Ewell
By Wilhelm & Bonnell
Attorneys.

Chas. J. Buchheit
Geo. J. Wirtz, Jr.
} Witnesses.

N. PETERS, PHOTO-LITHOGRAPHER, WASHINGTON, D. C.

UNITED STATES PATENT OFFICE.

SIMEON HOWES, ALPHEUS BABCOCK, (PER NORMAN BABCOCK COMMITTEE,) NORMAN BABCOCK, AND CARLOS EWELL, OF SILVER CREEK, NEW YORK, ASSIGNEES OF ROBY L. HORTON AND BYRON C. HORTON, ADMINISTRATORS OF CHACE B. HORTON, DECEASED.

IMPROVEMENT IN GRAIN-SCOURERS.

Specification forming part of Letters Patent No. 144,980, dated November 25, 1873; Reissue No. 8,352, dated July 30, 1878; application filed April 19, 1878.

*To all whom it may concern:*

Be it known that CHACE B. HORTON, deceased, late of Waterloo, in the county of Seneca and State of New York, did invent certain Improvements in Grain-Scourers, of which the following is a specification:

This invention relates to a machine for scouring and cleaning grain by means of brushes or their equivalents; and it consists of improvements in the construction of the vertical scouring-cylinder and the parts operating in conjunction therewith, as will be fully understood from the following description.

Figure 1:
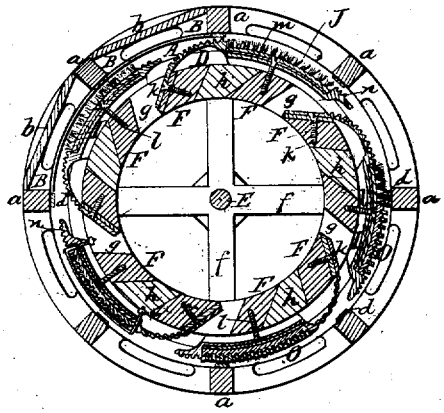
Figure 3:
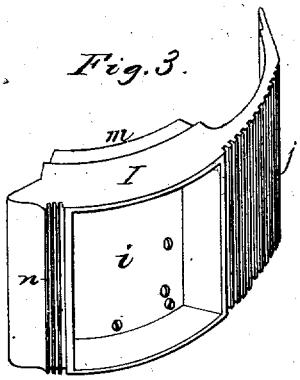
Figure 5:
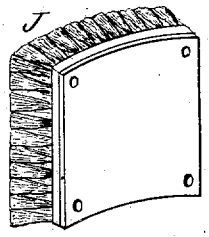
Figure 2:
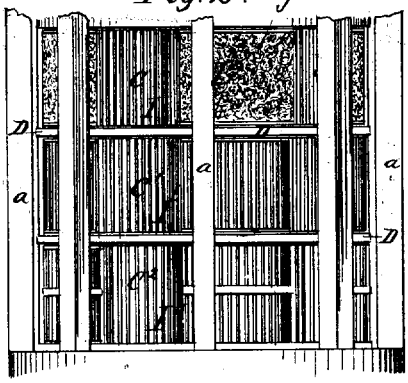
Figure 4:
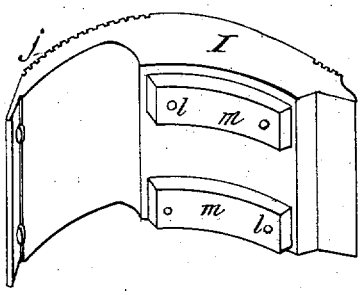
Figure 7:
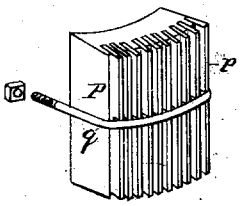
Figure 6:
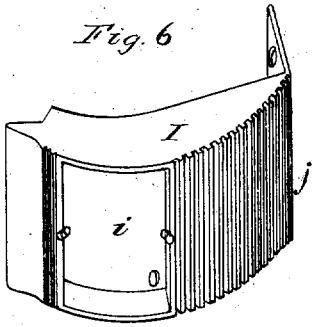

In the accompanying drawing, Figure 1 is a horizontal section through the machine, showing some of the sections of the scouring-cylinder provided with brushes and others with rubbing-blocks, a portion of the perforated scouring-shell being omitted. Fig. 2 is a side elevation of the same. Fig. 3 is a perspective face view, on an enlarged scale, of one of the sections of the scouring-cylinder with the brush removed. Fig. 4 is a perspective rear view of the same. Fig. 5 is a perspective rear view of the brush. Fig. 6 is a perspective face view of one of the sections of the scouring-cylinder with the scouring-block removed. Fig. 7 is a perspective face view of the scouring-block.

Like letters of reference designate like parts in each of the figures.

A represents the perforated scouring-shell, secured to the inner side of the vertical timbers or posts *a* of the case. B represents dust-chambers, formed between the timbers *a* by the perforated scouring-shell A and the outer tight panels *b*. C $C^1$ $C^2$ are scouring-chambers, formed in the scouring-case by horizontal rings or annular partitions D, secured to the inner side of the vertical timbers *a* or the metallic facings *d* thereof. E represents the vertical shaft of the machine; *f*, the lower spider or head, secured thereto and supporting the revolving scouring-cylinder. F are the vertical timbers or posts of the revolving cylinder; *g*, the air passages or spaces between the same, and *h* the filling between the timbers. I $I^1$ $I^2$ represent the metallic scouring sections or plates, secured to the revolving scouring-cylinder so as to operate within the scouring-chambers C $C^1$ $C^2$ of the surrounding case, as clearly shown in Figs. 1 and 2. The sections I $I^1$ $I^2$ are curved to conform to the curvature of the cylinder, and provided with a cavity or socket, *i*, for the reception of a brush, J, or other equivalent device, for detaching the impurities from the grain.

The front ends *j* of the scouring-plates I $I^1$ $I^2$ are made inclined or curved, and provided with corrugations or serrations for loosening the impurities and lifting or deflecting the grain onto the brush or other equivalent device arranged in the rear of this inclined scouring-surface. The inclined front ends of these scouring-sections are secured to the inclined sides of alternate vertical posts F of the rotating cylinder by screws *k*.

The scouring-sections may be constructed of iron by chill-casting; or they may be made of steel or steelified or case-hardened iron, if preferred.

The brushes J may be made of tampico or other suitable material, with backs of leather, wood, or any other suitable material.

The brushes are secured in place by screws *l* passing through wooden battens *m*, arranged on the rear side of the scouring-sections. If desired, the latter may be provided with short corrugated or serrated portions *n* at the rear ends of the brushes.

When a harder surface than a brush is required, a block of wood, O, having its face roughened by means of saw-kerfs, may be employed.

A very efficient and durable scouring-block is formed by employing a similar block, P, with strips *p* of iron or steel secured in its grooves. This block may be secured in place by a staple-bolt, *q*, wholly or partially embedded in the block, as shown in Fig. 7. In order to adjust a brush or scouring-block, it is removed and a suitable packing is placed in the bottom of the recess *i*; or set-screws may be arranged in the socket of the scouring-section, whereby the projection of the brush or block may be varied.

Five scouring-sections are preferably arranged in each scouring-chamber C $C^1$ $C^2$ of the machine; but the number may be varied, and the scourers may be arranged in any preferred order; or they may be all of one or two of the constructions described, or may be combined in any proportion with other scourers.

The recess or socket *i* of the scouring-section, besides constituting a very superior means for attaching and supporting the changeable brush or rubbing-block, serves also to confine the wear to the face of the brush or block, which consequently retains its original shape, lasts much longer, and operates more efficiently than it could if the edges of the brush or block were exposed.

The self-sharpening rasping-block P is so called from the fact that its cutting points or projections are kept prominent by the wear of the soft material between the same. This part of the present invention consists in the peculiar construction of the block, as specified.

The improved scourer has practically a continuous effective surface of iron and brush or rubbing-block, onto which the grain is gradually lifted or deflected by the front end of the scourer. Without this tangential end or its equivalent, a socket for the brush or rubbing-block would batter the grain around, and the brush or rubbing-block would be inoperative, or comparatively so.

The grain in its descent through the machine passes gradually from one compartment or chamber C $C^1$ $C^2$ into the one next below, the horizontal rings serving to retard the downward movement of the grain and to deflect it inward upon the brushes next below, thereby subjecting the grain thoroughly to the action of the brushes or scouring-blocks.

What we claim as the invention of the said CHACE B. HORTON is—

1. In a grain-scourer, the combination, with the brush J, arranged in a protecting-socket, *i*, of an inclined or curved plate, arranged in front of the brush and adapted to lift the grain upon the face of the brush, and an air-passage, *g*, arranged in front of such inclined or curved plate, substantially as set forth.

2. The tangential rubber for grain-scouring cylinders, constructed with a front end, *j*, adapted to force the grain into contact with the case, and with a socket, *i*, to hold a brush, J, or its equivalent, and to protect the edges thereof, substantially as herein described.

3. A tangential rubber for grain-scouring cylinders, having metallic rasping-surfaces *j n* at its respective ends, and an intermediate changeable brushing or rubbing surface J, formed and operating substantially as herein set forth.

4. A tangential rubber for grain-scouring cylinders having a wooden rubbing-block, O, held in a socket, *i*, and constructed with an effective surface formed by saw-kerfs, substantially as specified.

5. The combination, with the perforated scouring-shell A, provided with horizontal rings D, forming scouring-chambers C, of the scouring-brushes J, or their equivalents, arranged within the chambers C, or projecting into the same, and inclined or curved plates *j*, for forcing the material between the faces of the brushes and the perforated scouring-cylinder, substantially as shown and described.

SIMEON HOWES.
ALPHEUS BABCOCK,
*Per Norman Babcock Committee.*
NORMAN BABCOCK.
CARLOS EWELL.

Witnesses:
JNO. J. BONNER,
CHAS. J. BUCHHEIT.